United States Patent

Ballard et al.

[11] Patent Number: 5,288,330
[45] Date of Patent: Feb. 22, 1994

[54] METHOD AND APPARATUS FOR REMOVING CONTAMINANTS FROM PARTICULATE MATERIAL

[75] Inventors: Robert B. Ballard; Noel A. Shenoi, both of Houston, Tex.

[73] Assignee: Tuboscope Vetco International, Inc., Houston, Tex.

[21] Appl. No.: 893,845

[22] Filed: Jun. 4, 1992

[51] Int. Cl.[5] .................. B08B 3/04; B01J 39/00; B01J 39/16
[52] U.S. Cl. .................... 134/25.1; 134/5; 134/23; 134/19; 134/10; 210/660
[58] Field of Search ............... 423/92; 210/712, 710, 210/688, 638, 660, 723; 134/13, 25.1, 26

[56] References Cited

U.S. PATENT DOCUMENTS

| | | | |
|---|---|---|---|
| 2,969,294 | 1/1961 | Shyne | 502/416 |
| 4,460,292 | 7/1984 | Durham et al. | 405/129 |
| 4,585,753 | 4/1986 | Scott et al. | 502/401 |
| 4,778,628 | 10/1988 | Saha et al. | 252/633 |
| 4,780,239 | 10/1988 | Snyder et al. | 252/184 |
| 4,781,944 | 11/1988 | Jones | 427/228 |
| 4,789,475 | 12/1988 | Harte et al. | 210/502.1 |
| 4,998,848 | 3/1991 | Hansen | 405/128 |
| 5,019,245 | 5/1991 | Ignasiak et al. | 134/25.1 |
| 5,056,541 | 10/1991 | Schade et al. | 134/25.1 |
| 5,082,568 | 1/1992 | Holler | 210/688 |

OTHER PUBLICATIONS

*Comprehensive Inorganic Chemistry* vol. 2, Ch 18 p. 127 Published by Pergamon Press 1973, chapter written by E. W. Abel.

Primary Examiner—Theodore Morris
Assistant Examiner—Thomas G. Dunn, Jr.
Attorney, Agent, or Firm—Finnegan, Henderson, Farabow, Garrett & Dunner

[57] ABSTRACT

A method and apparatus for removing contaminants, including hydrocarbon and metal, from contaminated particulate material, such as gravel, soil, and the like. Initially, contaminants are removed by contact with water at a temperature higher than a melting temperature of the contaminants to remove them by melting. The removed contaminants are then subjected to specific gravity separation in water and filtration, including ion exchange and activated carbon filtration.

16 Claims, 1 Drawing Sheet

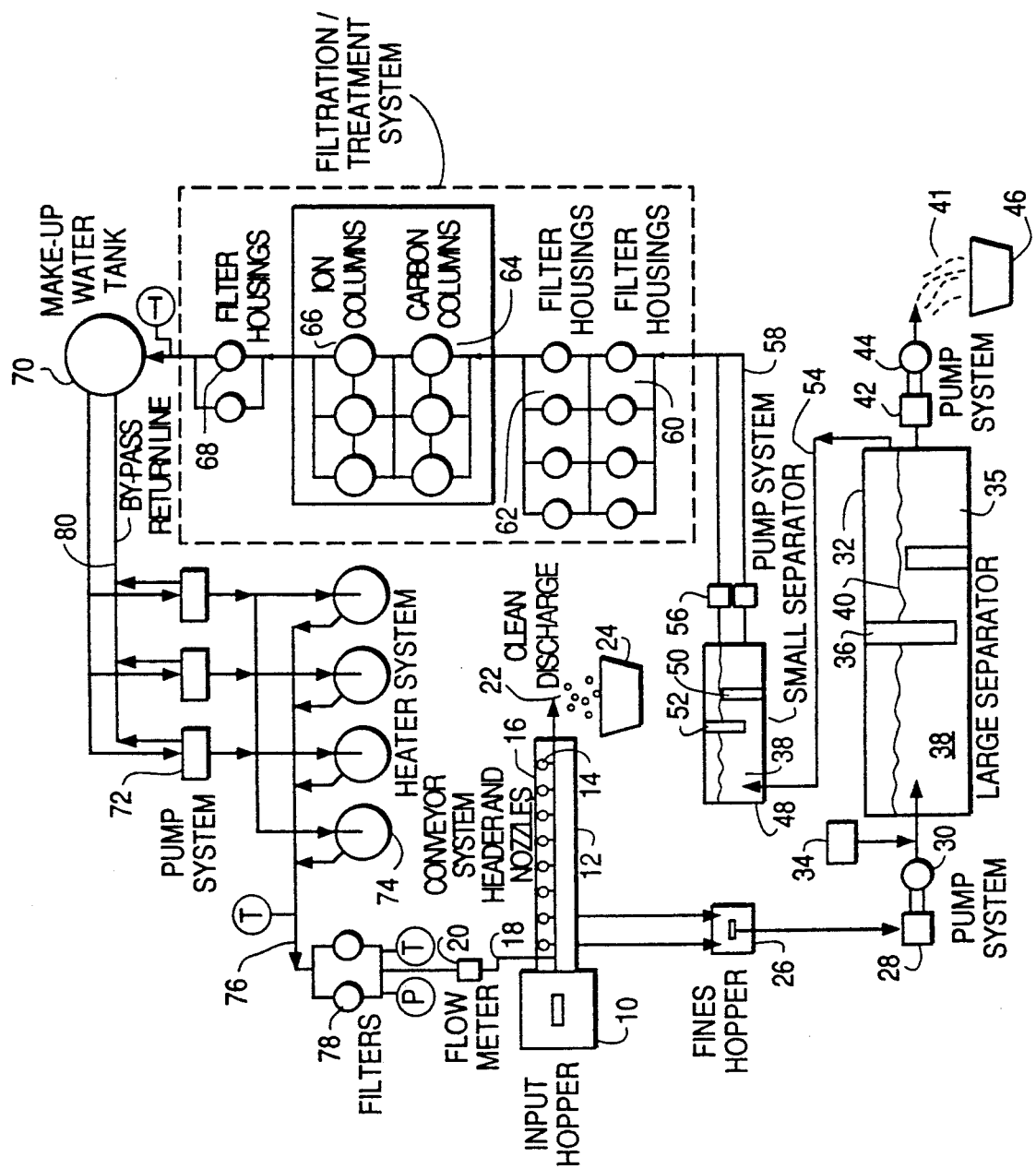

METHOD AND APPARATUS FOR REMOVING CONTAMINANTS FROM PARTICULATE MATERIAL

BACKGROUND OF THE INVENTION

1. Field of the Invention

The invention relates to a method and apparatus for removing contaminants, including hydrocarbons and metal, from contaminated particulate material, such as gravel, soil and the like.

2. Description of the Prior Art

In various industrial environments, particularly those where material beneficiation and chemical processing may be involved, it is common for the soil at the industrial site to become contaminated. These contaminants typically may include hydrocarbons and metals, with lead being one of the most common and hazardous metal contaminants. It is desirable, therefore, to have a practice for decontaminating particulate materials, particularly soil and gravel. The system for achieving this should be adaptable for use in various industrial sites and capable of removing a wide range of contaminants.

SUMMARY OF THE INVENTION

It is accordingly, an object of the present invention to provide a method and apparatus for removing contaminants from contaminated particulate material, such as gravel, soil and the like, that is amenable to use in a wide range of industrial applications.

In accordance with the method in the invention contaminants, including hydrocarbons and metal, are removed from contaminated particulate material, such as gravel, soil and the like. This is achieved by contacting the contaminated particulate material with water at a temperature higher than a melting temperature of at least some of the contaminants to produce melting and removal thereof from the particulate material. The particulate material from which the contaminants have been removed is collected. The collected material may, of course, be returned to its original site since it is no longer contaminated. At least a portion of the removed contaminants, including contaminants in particle form, along with water are subjected to specific gravity separation wherein a first portion of the contaminants in particle form having a specific gravity greater than water are removed and collected and wherein a second portion of the contaminants in particle form having a specific gravity less than water are separately removed and collected. A third portion of said contaminants is removed by subsequent filtering to leave a fourth portion of contaminants in the water, which fourth portion contains hydrocarbon and metal contaminants. A water soluble compound is introduced to the fourth portion, either before or after the filtering, to react with the metal contaminants to form a metal-containing compound capable of removal from the water by ion exchange filtration. The hydrocarbon contaminants are removed by activated carbon filtration. Any unreacted water-soluble compound is removed from the water by contact with an ion exchange resin or activated carbon. Filtering is then effected to remove the ion exchange resin and activated carbon particles resulting from filtration of the water.

After the specific gravity separation and prior to filtering, the third portion may be subjected to a second specific gravity separation for separate removal and separation of contaminants in particle form having a specific gravity greater than water and contaminants in particle form having a specific gravity less than water, which contaminants were not previously removed.

After filtering to remove the ion exchange resin and activated carbon particles from the water, the water may be heated and recirculated for contacting the contaminated particulate material for melting and removal of the contaminants.

Preferably, the contaminated particulate material is contacted with water by spraying and flooding the water onto the contaminated particulate material. This spraying may be conducted while moving the contaminated particulate material, such as along a conveyor.

The contaminants may include lead, with the water-soluble compound being acetic acid to react with the lead to form lead acetate. The acetic acid may be added prior to filtering to form the third portion.

The water may be at a temperature of at least 100° F.

The water after the filtering to remove the ion exchange resin and activated carbon particles from the water may be heated, filtered and recirculated for contacting the contaminated particulate material for the melting and removal of the contaminants.

At least a portion of the removed contaminants subjected to specific gravity separation is included in water with the water being present in a major amount.

The apparatus in accordance with the invention includes means for contacting the contaminated particulate material with water at a temperature higher than a melting temperature of at least some of the contaminants to produce melting and removal thereof. Means are provided for collecting the particulate material from which the contaminants have been removed. The collected material may be returned to its original site. Means are provided for specific gravity separation of at least a portion of the removed contaminants, including contaminants in particle form, with water to separate and collect a first portion of the contaminants in particle form having a specific gravity greater than water and separate and collect a second portion of the contaminants in particle form having a specific gravity less than water. Filtering means are provided for removing a third portion from the water to leave a fourth portion in the water containing hydrocarbon and metal contaminants. Means are provided for introducing to the third portion a water-soluble compound to react with the metal contaminants to form a metal-containing compound capable of removal from the water by ion exchange filtration. Means for removing the hydrocarbon contaminants by activated carbon filtration are provided. Means are also provided for removing any unreacted water-soluble compound from the water by contact with an ion exchange resin or activated carbon. Means for filtering to remove the ion exchange resin and activated carbon particles resulting from the filtration of the water are provided.

Means may be provided for an additional specific gravity separation of the third portion for separation and collecting of contaminants in particle form having a specific gravity greater than water and contaminants in particle form having a specific gravity less than water, which contaminants were not previously removed.

The means for contacting the contaminated particulate material with water may include a heater for heating the water. In addition, the means for contacting the contaminated particulate material with water may include means for spraying and flooding with the water.

Means may be provided for recirculating the water after the filtering to remove the ion exchange resin and activated carbon particles from the water.

Means may be provided for moving the particles during contacting of the particles with the water.

BRIEF DESCRIPTION OF THE DRAWING

The single figure of the drawing is a schematic diagram of one embodiment of apparatus in accordance with the practice of the invention.

DESCRIPTION OF THE PREFERRED EMBODIMENT

With reference to the single figure of the drawing, contaminated particulate material constituting gravel, soil or the like and having contaminants including hydrocarbons and metal is introduced by means not shown to an input hopper 10. The particulate material from the input hopper 10 is discharged onto a conveyor 12. Water is sprayed onto the particulate material as it moves along the conveyor through a series of water nozzles 14 to which water is introduced from a header 16 to which water is supplied from water line 18. The conveyor is positioned and adapted so that as the particulate material initially enters the conveyor, it is flooded with water from the water spray. This is beneficial to produce initial heating of the contaminants sufficient to ensure melting thereof. The flow of the water to the header 16 may be adjusted by flow meter 20, which may include a metering valve (not shown) for this purpose.

The water is heated, by the use of means later described, to a temperature above the melting temperature of at least some of the contaminants. In this manner, the contaminants are melted during spraying and flooding of the water onto the particulate material to clean the material, and the cleaned material, designated as 22, is then discharged from the end of the conveyor 12 into a collection hopper 24. Water from the conveyor and the contaminants in fine particle form removed from the particulate material 22 are introduced to a fines hopper 26. Typically, the material introduced to the fines hopper 26 includes 70% water and 30% contaminate particles.

This material from the fines hopper 26 is pumped therefrom by pump 28 through regulator valve 30 into a large separator 32. Acetic acid is added to the material entering the large separator 32 from acetic acid reservoir 34. Consequently, the material entering the large separator and contained therein constitutes typically 70% water and 30% contaminants in fine particle form from the fines hopper 26, with acetic acid added thereto.

The large separator 32 contains a baffle 35 extending a distance vertically from the bottom of the large separator 32 and an additional baffle 36 extending a distance vertically from the top of the large separator 32. The material 38 in the large separator introduced from the fines hopper 26 and having acetic acid added thereto is maintained by the valve 30 at a level 40 as shown in the drawing. The level 40 of the material 38 is slightly above the baffle 35, with the baffle 36 extending into and beneath the surface 40 of this material.

The material 38 typically has a residence time of 6 to 10 hours in the large separator and this, in practice, is dependent upon the size of the separator. This in typical applications permits sufficient settling time for particulate contaminants to settle to the bottom of the tank and thus be prevented from removal from the tank by baffle 35. The contaminants having a specific gravity less than water, such as oils and hydrocarbons, do not settle in the large separator but instead float in the material 38 and are prevented from leaving the separator by baffle 36. Periodically, the contaminants 41 from the large separator are removed therefrom by pump 42 through valve 44 to a container 46. These contaminants may then be either disposed of in a safe manner or subject to treatment to render them nonhazardous. During this removal operation, the valve 30 is closed and the pump 28 discontinues operation to permit the removal of the contaminants from the large separator 32.

A small separator 48 may be optionally provided from which the material 38 from the large separator 32 is introduced for an additional specific gravity separation operation. The structure and function of the small separator 48 is substantially identical to that of the structure and function of the large separator 32. In this regard, it contains baffles 50 and 52 which when material 38 from the large separator 32 is introduced function in the same manner as baffles 35 and 36 with respect to contaminant removal. The material 38 is introduced from the large separator 32 to the small separator 48 through supply line 54. Acetic acid may be added to the material entering the small separator or within it from a reservoir (not shown).

Dual pumps 56 are provided in supply lines 58 to pump the material not separated within the small separator 48 to a series of four filters 60. The filters 60 may be of the bag filter type wherein fine contaminant particles not removed by the specific gravity separation performed in the large and small separators are filtered from the water. Typically, the particles removed in this filtering operation are of a size greater than 3.5 microns. The material from filters 60 is then introduced to a series of four similar filters 62 wherein particles of a size of 1.5 microns or greater are removed by filtering.

The acetic acid introduced to the material 38 prior to entry into the large separator reacts with the lead contaminants to form lead acetate, which compound is water soluble and capable of removal by ion exchange filtration. This ion exchange resin filtration is achieved by introducing the material from the carbon columns 64 to ion exchange columns 66. Removal of the organic matter, including hydrocarbons, is achieved by activated carbon filtration in the carbon columns 64, along with possible removal of at least some lead acetate.

Thereafter, the material is introduced to ion exchange columns 66 wherein lead acetate not removed by the activated carbon filtration is finally removed. The lead acetate is negatively charged and the resin in the ion exchange columns is positively charged so that any lead acetate not removed during activated carbon filtration remains in the ion exchange columns. The material from the ion exchange columns is introduced through filters 68 wherein any ion exchange resin particles from the ion exchange column 66 or activated carbon particles from the carbon columns 64 may be removed prior to introducing the material, which is now in the form of water from which substantially all contaminants have been removed, to the makeup water tank 70. A series of pumps 72 are employed to pump material from the makeup water tank 70 through one or more of the four water heaters 74. The water after heating in the heaters 74 to the desired temperature for use in contaminant removal from the material introduced to the conveyor 12, as previously described, is introduced through water line 76 to the water line 18 leading to the header 16, as earlier described. The water prior to being introduced to the header is filtered by filters 78 to remove any debris therefrom which may have been introduced during residence in the makeup water tank 70 to prevent the spray heads 14 from becoming plugged. A bypass water return line 80 is provided for returning any water from the pumps 72 in excess of that required for use in spraying the material on the conveyor 12.

We claim:

1. A method for removing contaminants, including hydrocarbons and metal, from contaminated particulate material, comprising contacting the contaminated particulate material with water at a temperature higher than a melting temperature of at least some of said contaminants to produce melting and removal of said contaminants to produce particulate material from which said contaminants have been removed, collecting the particulate material from which the contaminants have been removed, subjecting at least a portion of the removed contaminants, including contaminants in particle form, with the water to effect specific gravity separation, wherein a first portion of said contaminants in particle form having a specific gravity greater than water are removed and collected and wherein a second portion of said contaminants in particle form having a specific gravity less than water are separately removed and collected to leave a third portion of said contaminants, filtering said third portion to leave a fourth portion in the water containing hydrocarbon and metal contaminants, introducing to said fourth portion before or after said filtering a water-soluble compound to react with said metal contaminants to form a metal-containing compound capable of removal from the water by ion exchange filtration, removing said hydrocarbon contaminants by activated carbon filtration, removing any unreacted water-soluble compound from the water by contact with an ion exchange resin or activated carbon, and filtering to remove the ion exchange resin and activated carbon particles resulting from the filtration of the water.

2. The method of claim 1, wherein after said specific gravity separation and prior to filtering, said second portion is subjected to a second specific gravity separation for separate removal and separation of contaminants in particle form having a specific gravity greater than water and contaminants in particle form having a specific gravity less than water, which contaminants were not previously removed.

3. The method of claim 1, wherein after said filtering to remove the ion exchange resin and activated carbon particles from the water, the water is heated and recirculated for contacting the contaminated particulate material for said melting and removal of said contaminants.

4. The method of claim 1, wherein the contaminated particulate material is contacted with said water by spraying and flooding said water onto said contaminated particulate material.

5. The method of claim 4, wherein said spraying is conducted while moving said contaminated particulate material.

6. The method of claim 1, wherein said contaminants include lead and wherein said water-soluble compound is acetic acid to react with said lead to form lead acetate.

7. The method of claim 6, wherein said acetic acid is added prior to said filtering to form said third portion.

8. The method of claim 7, wherein said water is at a temperature of at least 100° F.

9. The method of claim 7, wherein after said filtering to remove the ion exchange resins and activated carbon particles from the water, the water is heated, filtered and recirculated for contacting the contaminated particulate material for said melting and removal of said contaminants.

10. The method of claim 9, wherein said at least a portion of the removed contaminants subjected to specific gravity separation is included in said water with said water being present in a major amount.

11. Apparatus for removing contaminants, including hydrocarbons and metal, from contaminated particulate material, comprising means for contacting the contaminated particulate material with water at a temperature higher than a melting temperature of at least some of said contaminants to produce melting and removal of said contaminants, means for collecting the particulate material from which the contaminants have been removed, means for specific gravity separation of at least a portion of the removed contaminants, including contaminants in particle form, with the water to separate and collect a first portion of said contaminants in particle form having a specific gravity greater than water and separate and collect a second portion of said contaminants in particle form having a specific gravity less than water, filtering means for removing a third portion from said water to leave a fourth portion in the water containing hydrocarbon and metal contaminants, means for introducing to said third portion a watersoluble compound to react with said metal contaminants to form a metal-containing compound capable of removal from the water by ion exchange filtration, means for removing hydrocarbon contaminants by activated carbon filtration, means for removing any unreacted water-soluble compound from the water by contact with an ion exchange resin or activated carbon, and means for filtering to remove the ion exchange resin and any activated carbon particles resulting from the filtration of the water.

12. The apparatus of claim 11, comprising means for an additional specific gravity separation of said second portion for separation and collection of contaminants in particle form having a specific gravity greater than water and contaminants in particle form having a specific gravity less than water, which contaminants were not previously removed.

13. The apparatus of claim 12, comprising said means for contacting the contaminated particulate material with water including a heater for heating the water.

14. The apparatus of claim 13, comprising said means for contacting the contaminated particulate material with water including means for spraying and flooding the contaminated particulate material with said water.

15. The apparatus of claim 14, comprising means for recirculating the water after the filtering to remove the ion exchange resin and activated carbon particles from the water.

16. The apparatus of claim 15, comprising means for moving said particulate material during contacting thereof with the water.

* * * * *